United States Patent [19]

Pierce

[11] Patent Number: 5,605,084

[45] Date of Patent: Feb. 25, 1997

[54] SQUARING MACHINE FOR VARIOUS SIZED TUBES

[75] Inventor: Kenneth R. Pierce, Lake Zurich, Ill.

[73] Assignee: The E. H. Wachs Company, Wheeling, Ill.

[21] Appl. No.: 564,781

[22] Filed: Nov. 29, 1995

[51] Int. Cl.$^6$ ...................................................... B23B 5/16
[52] U.S. Cl. ........................................................ 82/113
[58] Field of Search ............................. 82/1.2, 113, 128; 408/104–107, 137; 279/123, 152, 153, 137

[56] References Cited

U.S. PATENT DOCUMENTS

| | | | |
|---|---|---|---|
| 3,938,411 | 2/1976 | Jonelis et al. | 82/113 |
| 4,365,528 | 12/1982 | Astle | 82/4 |
| 4,470,734 | 9/1984 | Miller | 82/1.2 |
| 4,739,682 | 4/1988 | Birkestrand | 82/113 |

OTHER PUBLICATIONS

The 300 Series Tube Squaring and Beveling Machines, Tri Tool, Inc. 2 pages.

*Primary Examiner*—M. Rachuba
*Assistant Examiner*—Kenneth J. Hansen
*Attorney, Agent, or Firm*—Patnaude, Videbeck & Marsh

[57] ABSTRACT

A squaring machine has an elongate housing with a rotatable spindle extending from one end thereof and attached to which is a tool for squaring the end of work piece. At the opposite end of the housing are first and second feed members, the first feed member in the form of a screw which is locked against axial movement within the housing, and the second feed member in the form a nut which is locked against rotation with respect to the housing. The feed nut is rotatably connected to an end of the spindle such that rotation of the feed screw will cause axial movement of the spindle. Also, the machine includes a first and second removable retainers, each of which has a pair of opposing jaws for clamping around a cylindrical work piece, however, the jaws of the first retainer are for grasping a work piece of a different size than the jaws of the second retainer. Within each of the pairs of jaws are a pair of replaceable shoes and each of the pairs of replaceable shoes is adapted to retain a work piece of a different size, such that the machine can be used to square a wide range of sizes of work pieces. In a second embodiment, a collet for retaining a work piece comprises a plurality of wedge segments, and each of the wedge segments has inner and outer surfaces which, when the segments are assembled, form a collet having a cylindrical bore and a frustoconical outer surface, and the segments are retained in aligned relationship within a nut attachable to the machine.

7 Claims, 7 Drawing Sheets

SQUARING MACHINE FOR VARIOUS SIZED TUBES

The present invention relates to machines used to square the ends of pipes, tubes, or fittings, and in particular to machines having collet retainers for receiving replaceable collets, and machines having a plurality of sizes of collet retainers, such that the machine is usable to square the ends of a wide range of sizes of pipes, tubes or fittings.

BACKGROUND OF THE INVENTION

Tube squaring machines are required to precision cut a square surface at the end of a piece of pipe or a tube, such that a precision weld can be made for attachment of the pipe or tube end to a fitting or to an adjacent length of pipe or tube. Similarly, squaring machines are used to cut a square surface at the end of a fitting for the attachment of a fitting to a length of pipe or tube. In many cases, a tube or fitting must have a square end and the cut must be to an exact length.

Existing squaring machines grip the end of the tube in a collet to hold the axis of the tube aligned with the axis of a rotating cutter which will remove a portion of the metal at the end of the tube, such that the end thereof will be square. Existing squaring machines, however, do not have a means for precision indexing the feed of the tool, and the feed of such machines can not be adjusted to remove a predetermined amount of metal. An operator will frequently perform a series of machining operations, each time shearing off a small portion of the metal of the tube, removing the tube from the machine to measure its length, and then machine off more metal until the desire length of the tube has been reached. If care is not exercised, too much metal may be removed and the piece rendered useless.

In existing squaring machines, the feed is controlled by a handle which rotates a cam to move the tool against a work piece. Such cam operated feeds to not provide a linear relationship between the advancement of the feed and the angle of the handle, and as a result, the operator can not determine the distance that the feed has advanced by observing the angle through which the handle has been rotated.

Furthermore, to cut a square end to a piece of pipe or tubing, existing machines have a collet retainer at the end of the machine for receiving a collet to clamp the end of the tube in the desired orientation. Such retainers have a tapered bore into which a complementary shaped frustoconical collet is fitted, and a nut is threaded over one end of the retainer to force the collet within the tapered bore to compress it around a pipe or tube. To retain the end of a work piece in such a squaring machine, one must first slide the retaining nut over the work piece, fit the end of the work piece into a collet, fit the collet with the work piece therein into the tapered bore of the machine, and finally, tighten the nut against the collet.

Existing squaring machines also have a collet retainer of a given size, such that the maximum inner diameter of the pipe or tube which may be fitted into the machine is limited by the maximum diameter of the collet which the retainer on the machine can receive. On the other hand, the minimum diameter of a piece of tubing which can be squared by such machines is limited to the minimum diameter of a piece of tubing which can be grasped by a collet having a given outer diameter. As a result, if one wishes to square the ends of a wide range of sizes of tubes, one must use a plurality sizes of tube squaring machines.

Existing collets are generally made of a unitary piece of metal having elongate slots in the length thereof, such collets permit little expansion of the inner diameter from the compressed position in which the collet is locked against the outer surface of a work piece, and the relief position, in which the work piece can be removed from the collet.

It would be desirable to provide a squaring machine for which the feed can be accurately measured and controlled. Also, it would be desired to provide a squaring machine which can be used to square the ends of tubing, or fittings, having a wide range of sizes.

It would also be desirable to provide a collet for use in such a machine in which the expanded, relief position thereof is substantially larger than the compressed locked position, and further provide a collet which can be more easily fitted around a work piece than existing collets.

SUMMARY OF THE INVENTION

Briefly, the present invention is embodied in a squaring machine having an elongate generally cylindrical housing with a drive member, in the form of a worm gear rotatable therein. The machine has a spindle axially slidable within the drive member with a first end of the spindle extending out of a first end of the housing for retaining a tool thereon. At the opposite end of the housing is a first feed member, in the form of a feed screw which is locked against axial movement within the housing and has threads along a portion of the outer surface thereof. A second feed member, in the form of a feed nut, has internal threads which engage the external threads of the feed screw, and the feed nut is locked against rotation within the housing, but is longitudinally slidable within the housing. The spindle is locked for rotation with the worm gear, and is rotatably attached to the feed nut for axial movement with the feed nut. The feed screw is attached to an axial cap, such that rotation of the cap will axially move the feed nut and the spindle, thereby providing a linear axial feed of the first end of the spindle in response to the rotation of the cap.

In another aspect of the invention, a first removable retainer is attached to the first end of the housing, and the retainer has a pair of opposing jaws for clamping around the end of the length of tubing, or a fitting, to retain the tubing, or fitting, with the longitudinal axis thereof axially aligned with the longitudinal axis of the spindle. The jaws are adapted to receive replaceable shoes, having given outer dimensions, each pair of shoes is adapted to clamp around the distal end of a piece of tubing, or fitting of a given size. Accordingly, the jaws of the first retainer can retain a plurality of sizes of tubing, or fittings corresponding to the sizes of shoes retainable therein.

A second removable retainer is also provided which has a pair of jaws adapted to receive a second plurality of shoes having outer dimensions which are different then the outer dimensions of the shoes of the first retainer. The second retainer, and its associated shoes will retain a range of sizes of tubing or fittings which is different from the range of sizes of tubing or fittings retainable by the first retainer and its associated shoes. The machine can be used to square tubing or fittings which can be retained in either the first retainer or the second retainer.

In another embodiment of the invention, a workpiece in the form of a length of tubing, is retained in a tube squaring machine by a collet assembly in a frustoconical collet retainer. The collet comprises a plurality of wedge segments each of which has an inner and outer surface. The inner surfaces of each of the segments is cylindrical, such that when the segments are assembled and compressed together to form a collet, the combined inner surfaces define a cylindrical bore through the assembled segments. The outer surfaces of each of the segments is a portion of a frustoconical surface, with a larger end and a smaller end, and the outer surfaces of the assembled segments define a single frustoconical surface having a large diameter end and a narrow diameter end. The large end of each of the segments has a groove in the outer surface thereof which will align with the grooves of adjacent segments when the segments are assembled and thereby form an annular groove around the large diameter end of the assembled segments. A nut for retaining the segments assembled to form a collet has an inner annular flange having a thickness a little narrower than the width of the grooves on the outer surfaces of the segments and the segments are retained in aligned relationship when they are positioned within the nut with the flange of the nut fitted in the grooves of the segments. An inner annular groove extends around a tubular protrusion at the large end of the assembled segments, and an 0-ring fitted into the groove applies a radially outward force to the segments to retain them against the annular flange of the nut. The unit comprising the nut and the collet formed by the aligned segments can be attached to the end of tube squaring machine to simplify the retaining of a work piece in the machine.

GENERAL DESCRIPTION OF THE DRAWINGS

A better and more complete understanding of the present invention will be had from a reading of the following detailed description taken in conjunction with the accompanying drawings wherein.

DETAILED DESCRIPTION OF A PREFERRED EMBODIMENT

Figure 1:
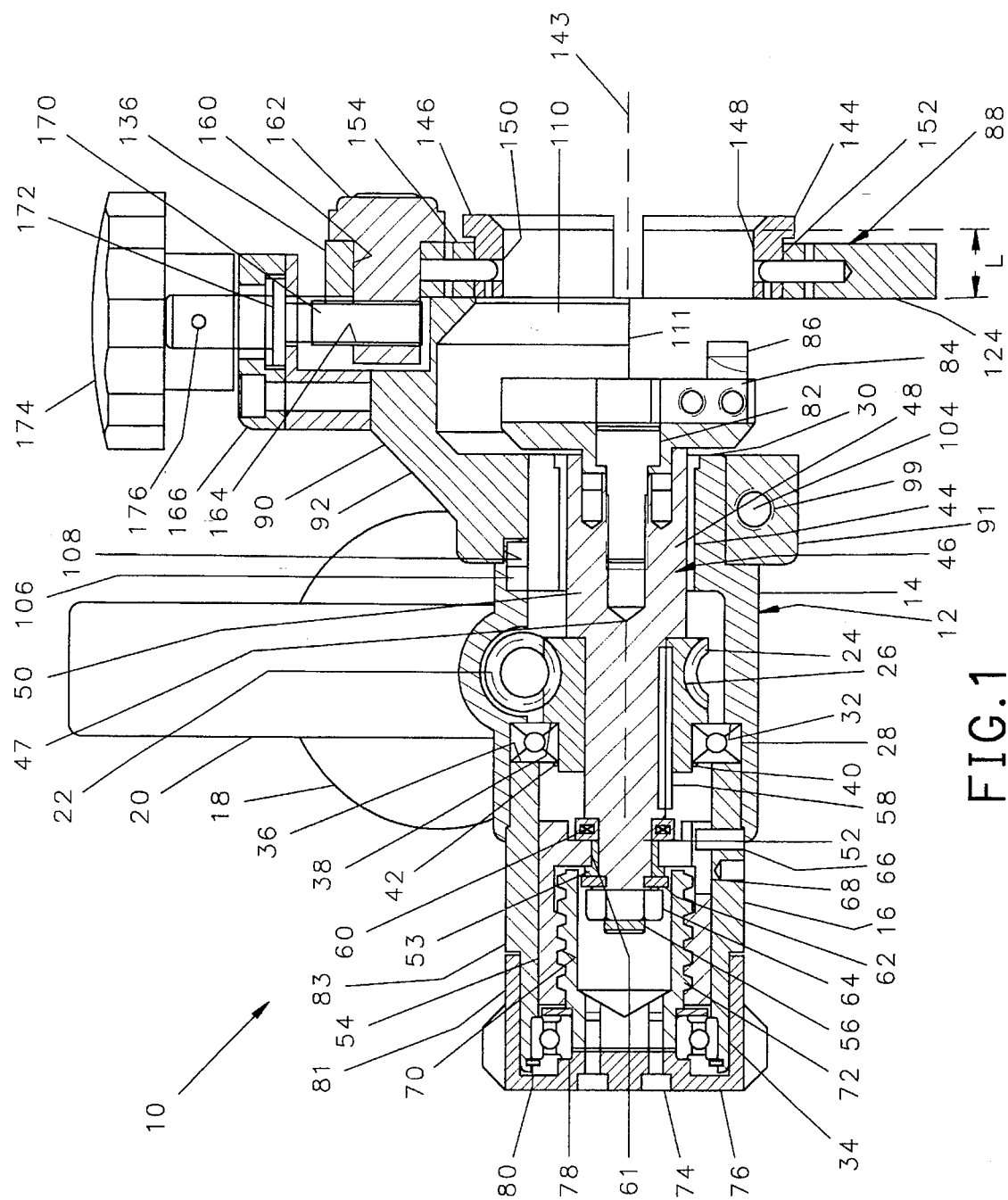
FIG. 1 is a cross-sectional side view of a tube squaring machine in accordance with the present invention.

Referring to FIG. 1, a squaring machine 10 has a housing 12 comprised of first and second housing members 14, 16 respectively and is driven by a motor 18 supported on an elongate handle 20. The motor 18 rotates a worm shaft 22 which is engaged with the threads of a worm gear 24 on the outer surface of a tubular shaft 26 journalled for rotation in bearings 28 within the first housing member 14. The bearing 28 is retained against axial movement towards the first end 30 of the housing 12 by an annular ridge 32 and against axial movement towards the second end 34 of the housing 12 by the distal end 36 of the second housing member 16. The shaft 26 has an annular shoulder 38 to retain it against axial movement within the bearing 28 toward the first end 30, and an annular retaining ring 40 fitted into an annual groove 42 on the rearward end of the shaft 26 to retain it against movement toward the second end 34.

An elongate spindle 46 has a longitudinal axis 47, a first cylindrical portion 48 which is journalled for rotation in a bushing 44 in the forward first end 30 of the housing 12, a second narrower cylindrical portion 50 which is axially slidable within the central bore of the tubular shaft 26, a third narrower cylindrical portion 52 which is journalled in bearings 53 of a tubular feed ring 54, and a threaded cylindrical fourth portion 56. A key 58 on the second cylindrical section 50 is engaged in an elongate groove in the bore of the shaft 26 thereby locking the spindle 46 for rotation with the shaft 26. A thrust bearing 60 is fitted around the third cylindrical portion 52 of the spindle 46 and abuts against a shoulder between the second and third cylindrical sections 50, 52 respectively, and the thrust bearing 60 and bushing 53 are retained within an annular bore 61 at the forward end of the feed ring 54 by a washer 62 and a nut 64 threaded on the distal end 56 of the spindle 46.

The feed ring 54 has a cylindrical outer surface and is axially slidable within the cylindrical rearward end of the second housing member 16, and locked against rotation relative to the housing by a pin 66 which extends through the second housing member 16 and into an elongate slot 68 on the feed ring 54. The cylindrical inner surface of the feed ring 54 has threadings 70 which engage the threads of a feed screw 72, the distal end of which is attached, by a plurality of bolts 74, to a rotatable end cap 76. The feed screw 72 and the end cap 76 are journalled for rotation within the distal end of the second housing member 16 in a bearing 78 which is retained within the housing by an annular ring 80 fitted into a complementary groove in the second housing member 16. Around the forward end of the cap 76 are indices 81 and around the circumference of the housing 12 adjacent the forward end of the cap 76 are indexing marks 83 such that the angular rotation of the cap 76 can be accurately determined.

As can be seen, rotation of the cap 76 will cause rotation of the feed screw 72 bolted thereto and will cause axial movement of the feed ring 54. The rearward end of the spindle 46 is rotatably retained in the feed ring 54, but locked for axial movement with the feed ring 54 by the bearing 60 and bushing 53. The second portion 50 of the spindle 46 has a length longer than the length of the shaft 26, such that the second portion 50 of the spindle is axially slidable within the shaft 26. As a result, the rotation of the end cap 76 in one direction will cause the spindle 46 to advance outward of the forward end 30 of the housing 12, and rotation of the end cap 76 in the opposite direction will cause the spindles 46 to be withdrawn inward into the forward end 30 of the housing. Also, the spindle 46 is locked for rotation with the shaft 26 by the key 58 and is thereby driven through the worm shaft 22 by the motor 18.

Attached to the forward end of the spindle 46 by an axial retaining bolt 82 is a generally circular cutter holder 84 which removable retains a cutting blade 86. The forward end of the spindle 46 is the shaft which rotates the cutter blade 86.

Figure 2:
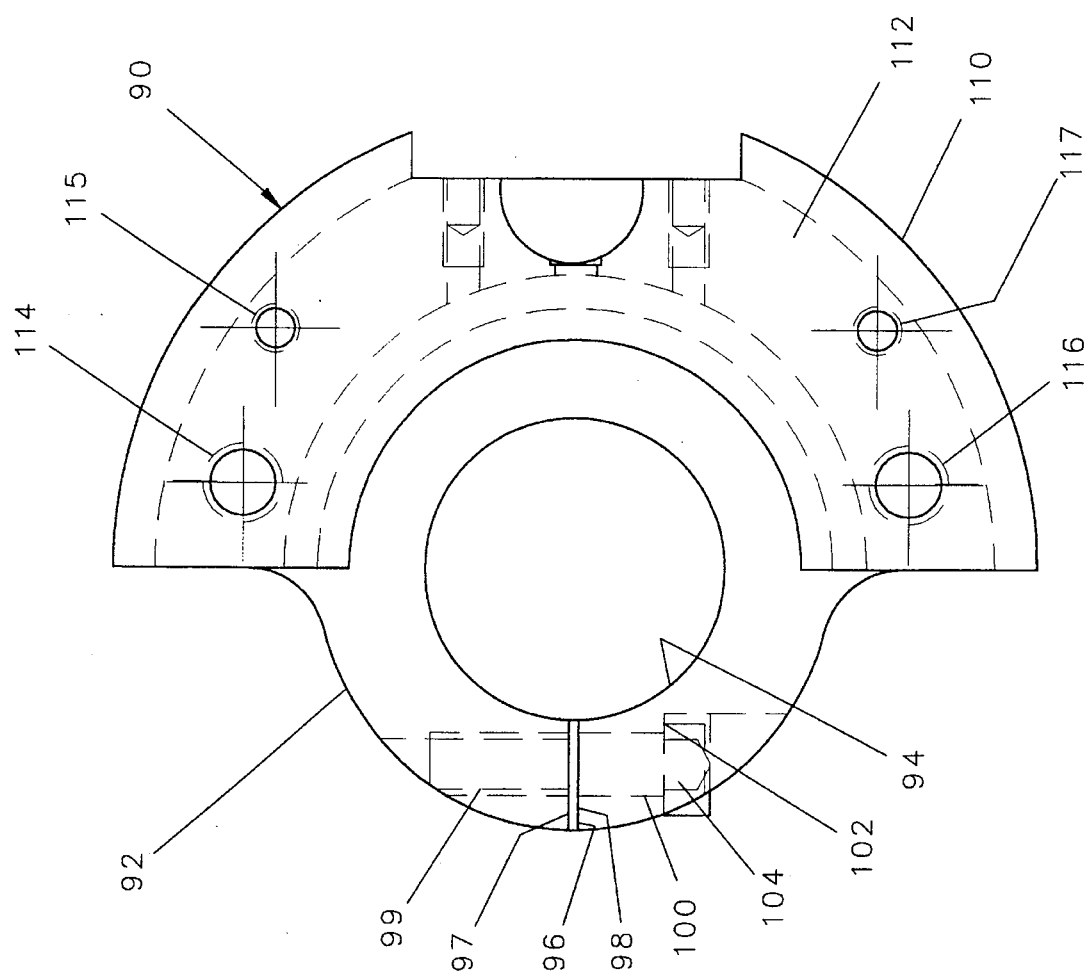
FIG. 2 is a front end view of the retainer body shown in FIG. 1 with portions thereof shown in phantom lines.

Referring to FIGS. 1 and 2, fitted around the outer surface of the forward end 30 of the housing 12 is a retainer 88 having a retainer body 90. The retainer body 90 has a generally tubular rearward mounting portion 91 with a cylindrical bore 94 therein, the inner diameter of which is sized to snugly fit around the outer diameter of the forward end 30 of the housing 12. The mounting portion 92 further has a longitudinal slot 96 extending from the outer surface thereof to the inner bore 94, such that the mounting portion 92 is substantially C shaped with the distal ends of the C forming spaced faces 97, 98 in close proximity to one another as shown in FIG. 2. A threaded transverse hole 99 in one of the faces 97 is axially aligned with a second transverse hole 100 perpendicular to the second face 98, and has a countersink 102 at the end opposite face 98, such that a bolt 104 can be extended through the aligned hole 100 and into the threaded hole 99. Tightening the bolt 104 will tighten the mounting portion 92 of the retainer body 90 to the outer surface of the housing 12. Also, as best shown in FIG. 1, a pin 106 extending from the housing 12 is received within a cylindrical hole 108 in the retainer body 90 to angularly orient the retainer 88 relative to the housing 12.

Referring to FIG. 2 at the forward end of the retainer body 90 is an arcuate flange 110 having a forward planar face 112 oriented perpendicular to the axis of the bore 94 and forwardly offset from the mounting portion 92. As best shown in FIG. 1, between the flange 110 and the mounting portion 91 is a semi-cylindrical section 111 having a C-shaped cross-section which retains the jaws 124, 136 described below on an axially extending cantilever with the semi-cylindrical section 111 forming an open area for viewing the end a work piece held in the jaws. Referring to FIGS. 1, 2, 3 and 6, the face 112 has a plurality of threaded bores 114–117 therein for receiving retaining bolts 119–122 which extend through complementarily located holes 113, 118, 123, 125 in a C-shaped, generally planar first jaw member 124 for retaining it to the body 90. The first jaw member 124 is therefore removable retained to the retainer body 90. The first jaw member 124 has a semi-circular inner surface 126, the two ends of which merge into opposing parallel inner side surfaces 128, 130 respectively. Each of the inner side surfaces 128, 130 has a groove 127, 129 with parallel faces 132, 134 respectively along the length thereof on the side of the jaw member 124 which mates against the face 112 of the mounting body 90. A second jaw member 136 has opposing parallel sides 138, 140 which are spaced from one another a distance which is a little less than the distance between the parallel faces 132, 134 of the grooves 127, 129 of the first jaw member 124, and the thickness of the second jaw member 136 along the parallel sides 138, 140 is less than the depth of the grooves 127, 129, such that the second jaw member 136 is slidable in the grooves 127, 129 between the first jaw members 124 and the forward face 112 of the retainer body 90.

The second jaw member 136 further has an arcuate surface 142 extending between the opposing parallel side surfaces 138, 140. The second jaw member 136 is positioned with the sides 138, 140 fitted into the grooves 132, 134 respectively of the first jaw member 124, so that the second jaw member 136 can be moved relative to the first jaw member 124 and the arcuate inner surface 126 of the first jaw member and the arcuate surface 142 of the second jaw member can be positioned to define a cylindrical opening the axis 143 which is axially aligned with the axis of the mounting portion 92 and therefore axially aligned with the axis 47 of the spindle 46. The two arcuate surfaces 126, 142 respectively also have an annular groove 141, 143 around the cylindrical surface formed by the assembled jaw members 124, 136, and the jaw member 124, 136 each have a blind bore 145, 147 respectively in the arcuate surfaces 126, 142, and into each of the blind bores 145, 147 are fitted pins 149, 151 respectively. Each of the pins 149, 151 has a transverse hole 153, 155 near the end thereof which extends outward from the surfaces 124, 142 respectively and retained in each of the holes 153, 155 is a spring loaded detention ball 157, 159 respectively.

Referring to FIG. 1, 4, 5 and 6 to retain a cylindrical work piece with the axis thereof axially aligned with the axis 47 of the spindle 46 a pair of shoes 144, 146 are fitted, with a first shoe member 144 against the surface 126 of the first jaw member 124 and a second shoe member 146 against the surface 142 of the second jaw member 136. Each of the shoes 144, 146 is generally arcuate in shape and when assembled into the respective jaw members 124, 136 and the second jaw member 136 is slid against the first jaw member 124, the inner surfaces 148, 150 thereof define a cylindrical opening having a diameter a little less than the diameter of a size of tubing to which the retainer 88 is to receive. Each of the shoes 144, 146 has an arcuate ridge 152, 154, respectively around the outer surface thereof which is adapted to fit within the complementary shaped groove 141, 143 of the jaw members 124, 136 respectively, and each of the shoes has a radial blind bore 156, 158 respectively in the outer surface thereof for receiving the pins 149, 151 extending from the inner surface 126, 142 thereof respectively. Perpendicular to each of the blind bores 156, 158 are intersecting bores 161, 163 respectively which are aligned to receive their respective detention ball 157, 159 on the associated pin 149, 151 respectively. The grooves 141, 143, the pins 149, 151 and the detent balls 157, 159 of the jaws 124, 136 and the complementary ridges 152, 154, bores 156, 158 and intersecting detent bores 161, 163 respectively enable an operator to install and remove the shoes 144, 146 to the jaws 124, 136 without the use of tools. Also, as can best be seen in FIG. 1, the axial length "L" of the cylindrical bore defined by the inner surfaces 148, 150 is only about five eights of an inch. I have found that the machine can retain a cylindrical work piece having a diameter of up to two and a half inches with the axis thereof aligned with the axis of the spindle 46 by a pair of shoes having a relatively short axial length which grip the work piece, the axial length "L" of which is no more than ¾ inch. Larger diameter work pieces can be retained in a pair of shoes the inner bore of which has an axial length of no more than one and one half inches.

Figure 3:
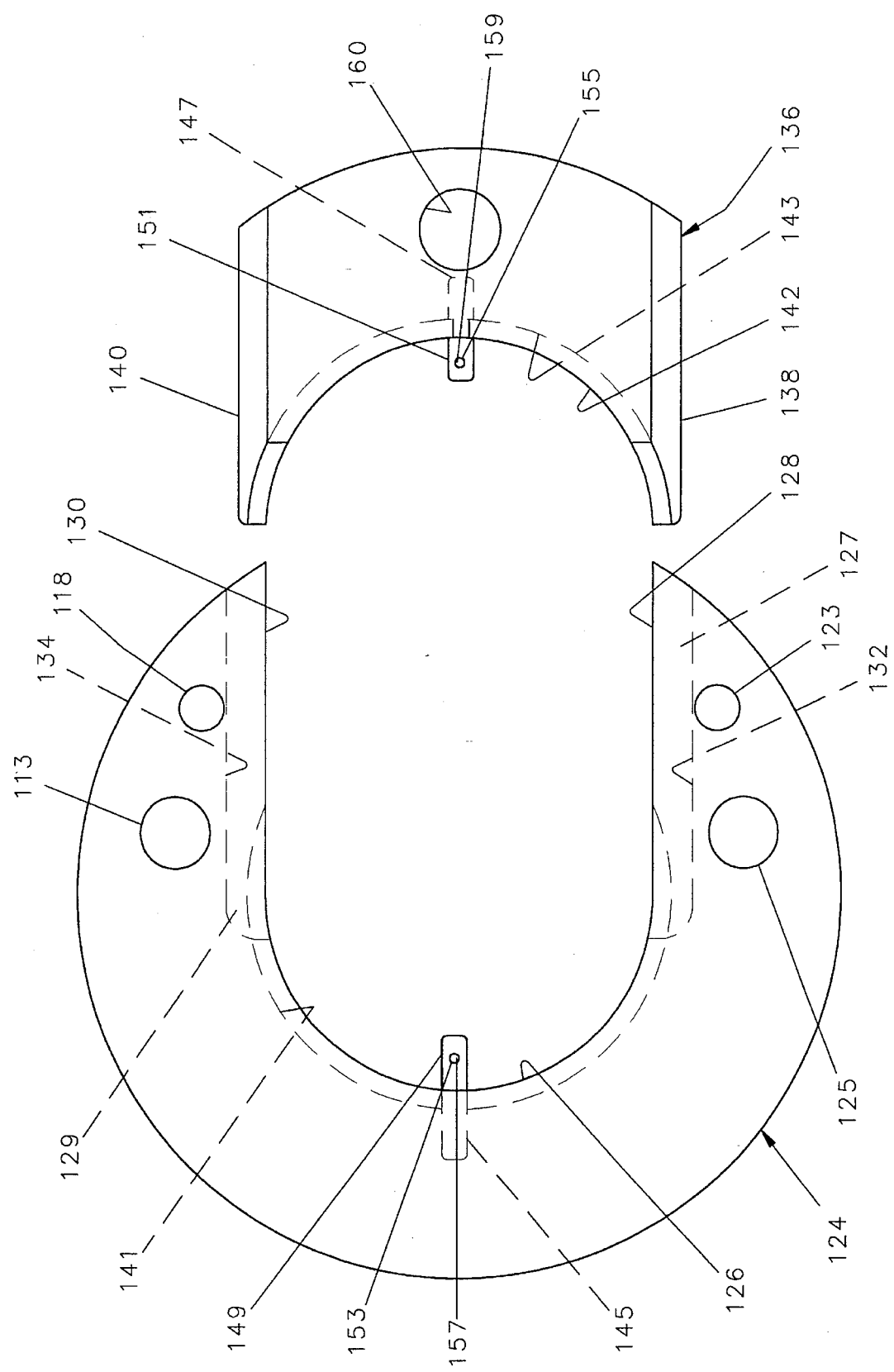
FIG. 3 is an exploded front end view of the first and second jaws for attachment to the retainer of FIG. 2 with portions thereof shown in phantom lines.
Figure 6:
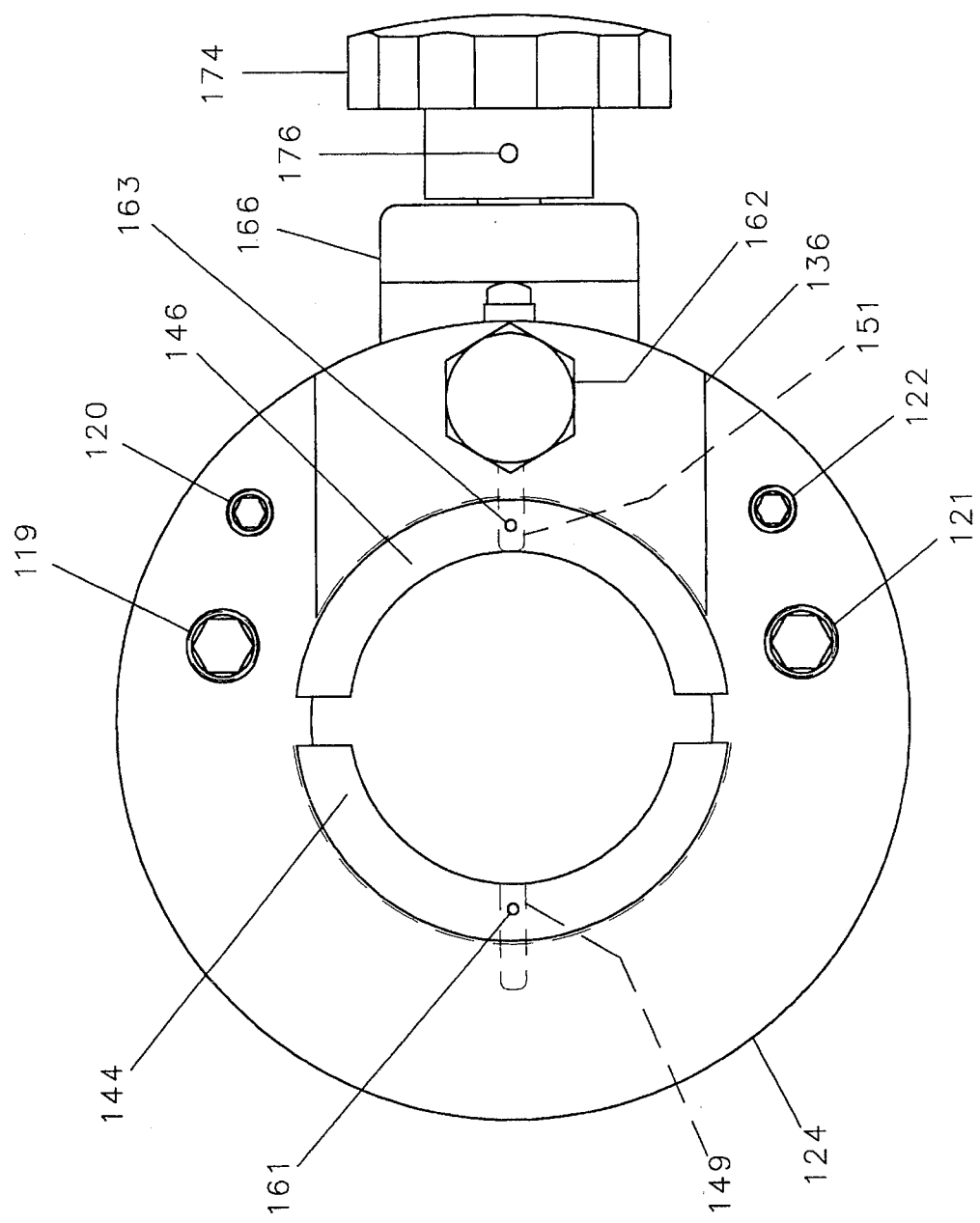
FIG. 6 is a front end view of the jaws and inserts of FIGS. 3 and 4 attached to the body of FIG. 2 to form a retainer.

Referring further to FIGS. 1, 3 and 6, the second jaw member 136 has a transverse hole 160 into which is fitted a pin 162. Perpendicular to the longitudinal axis of the pin 162, near one end thereof is a threaded hole 164. Extending into the threaded hole 164 is the threaded end of an adjusting screw 170 which is rotatable within a retaining bracket 166 and retained against axial movement by an annular flange 172 on the screw 170. An adjusting knob 174 is attached to the outer end of the adjusting screw 170 by a set screw 176. It should be appreciated that by removing the retaining bolts 119–122 in the first jaw members 124, both the first jaw member 124 and the second jaw member 136 can be removed from the retainer body 90.

Figure 7:
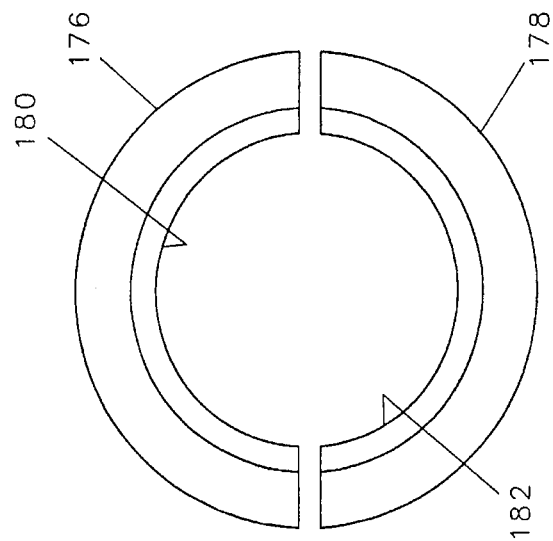
FIG. 7 is a front end view of a second pair of shoes for insertion in the jaws of the machine of FIG. 1.
Figure 5:
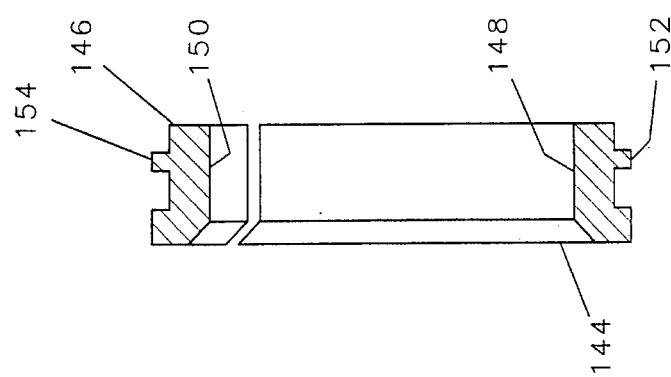
FIG. 5 is a cross-sectional view of the shoes shown in FIG. 4 taken through line 5—5 thereof.
Figure 4:
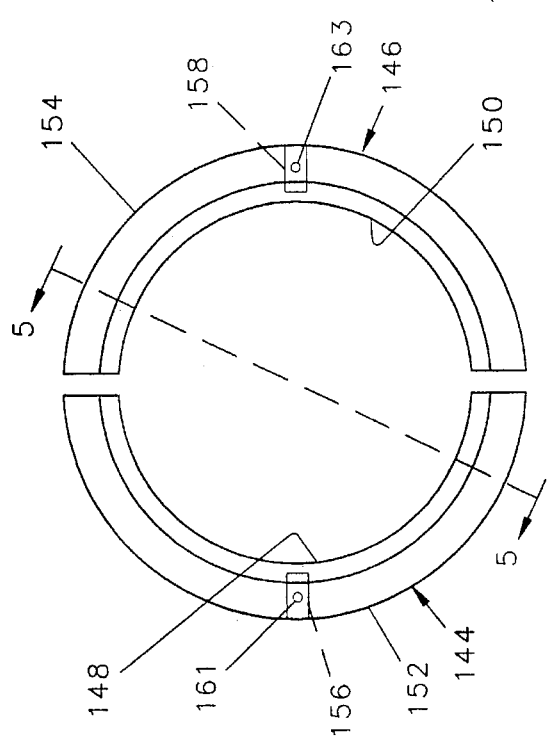
FIG. 4 is a front end view of first and second shoes for insertion in the jaws in FIG. 4 with the borings therein shown in phantom lines.

Referring to FIG. 7, the inner surfaces 126, 142 of the first and second jaw members 124, 136 respectively are adapted to receive the plurality of sizes of shoes, such as the second set of shoes 176, 178 shown in FIG. 7. As can be seen, the shoes 176, 178 have arcuate inner surfaces 180, 182 which when mated to one another to form a cylindrical opening which is a little smaller than the opening formed between shoes 144, 146. Accordingly, the jaws 124, 136 can receive shoes adapted to receive a plurality of sizes of tubing and retain the tubing with the axis thereof aligned with the axis of the spindle 46. Also the shoes can be changed as needed without the use of tools because each shoe 144, 146 is aligned in place by the flange 152, 154 which are received in the complementary groove 141, 143 in the associated jaw members 124, 136 and the shoes are retained by the pins 149, 151 and detent balls fitting into the blind holes 156, 158.

Referring to FIG. 1, when a tool holder 84 and tool 86 are attached to the end of the spindle 46 and a piece of tubing is retained between the shoes 144, 146 of the jaws, the rotating tool 86 can be linear moved against the end of the tube by rotating the adjusting cap 76. The tool 86 will then cut the end of the tubing after which the tubing will have an end the plane of which is perpendicular to the axis of the tubing. Also, since there is a linear relationship between the angular rotation of the cap 76 and the axial movement of the spindle 46 and the tool 86, the indices 81 and markings 83 may be used to axially move the spindle a predetermined distance and thereby remove a desired amount of metal from the end of a work piece.

Figure 8:
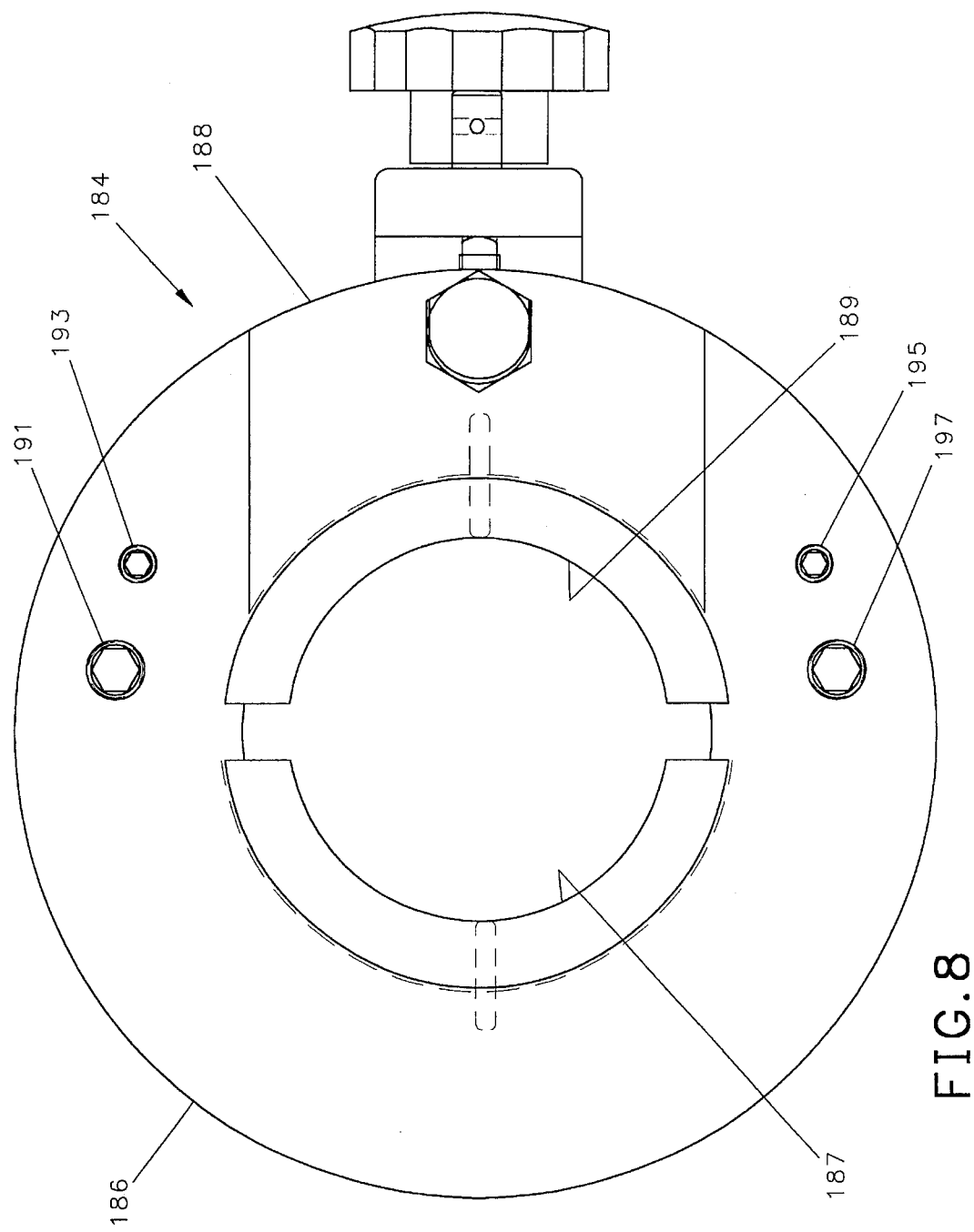
FIG. 8 is a front end view of a second retainer having jaws of a larger size than the jaws shown in FIG. 3 and 6 and adapted to receive shoes for retaining correspondingly larger diameters of tubing.

Referring to FIG. 1 and 8, in the event that machine 10 is intended to be used to square the end of a piece of tubing having an outer diameter which is larger then the maximum inner diameter of the surfaces 148, 150 of the shoes 144, 146 that can be fitted therein, the cutter holder 84, can be removed by first removing the retaining bolt 82 after which the retainer 88 can be removed from the housing 12 by loosening the bolt 104 and them removing the mounting portion 92 from the housing 12. Thereafter, a second retainer 184 having a second set of jaws 186, 188, depicted in FIG. 8 as larger than the jaws 124, 136 of the first retainer 88 can be attached. Like the first retainer 88, the second retainer 184 can receive a plurality of sizes of shoes 187, 189 such that the second retainer 184 can also be used to retain a plurality of sizes of tubing therein.

As an alternate method of adapting the machine 10 to receive a work piece which has a diameter larger than the inner diameter of the jaws 144, 146, the jaws themselves may be removed from the machine and replaced. In accordance with this method, the bolts 119–122 are removed and a second set of jaws, such as jaws 186, 188 having holes 191, 193, 195, 197 spaced to align with the threaded bores 114–117 of the retainer 90, is fitted against the retainer body 90 and the retaining bolts 119–122 reinserted.

Figure 10:
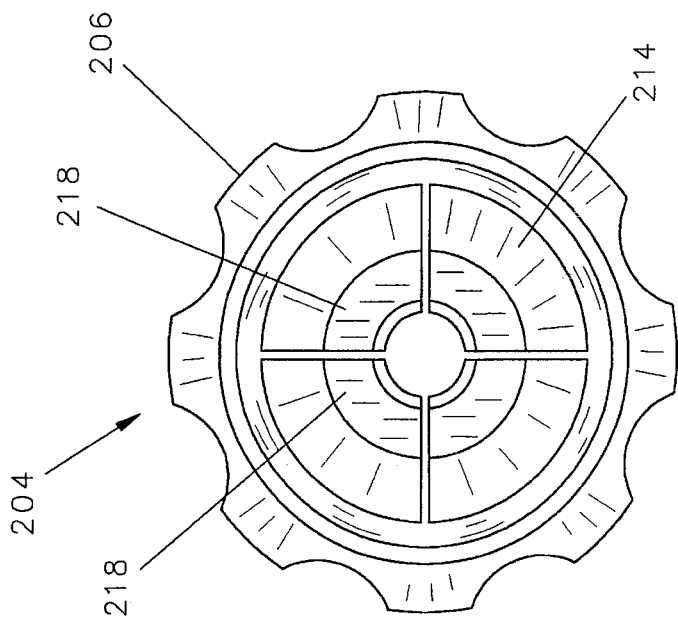
FIG. 10 is an inside end view of the nut and collet end nut shown in FIG. 9.
Figure 9:
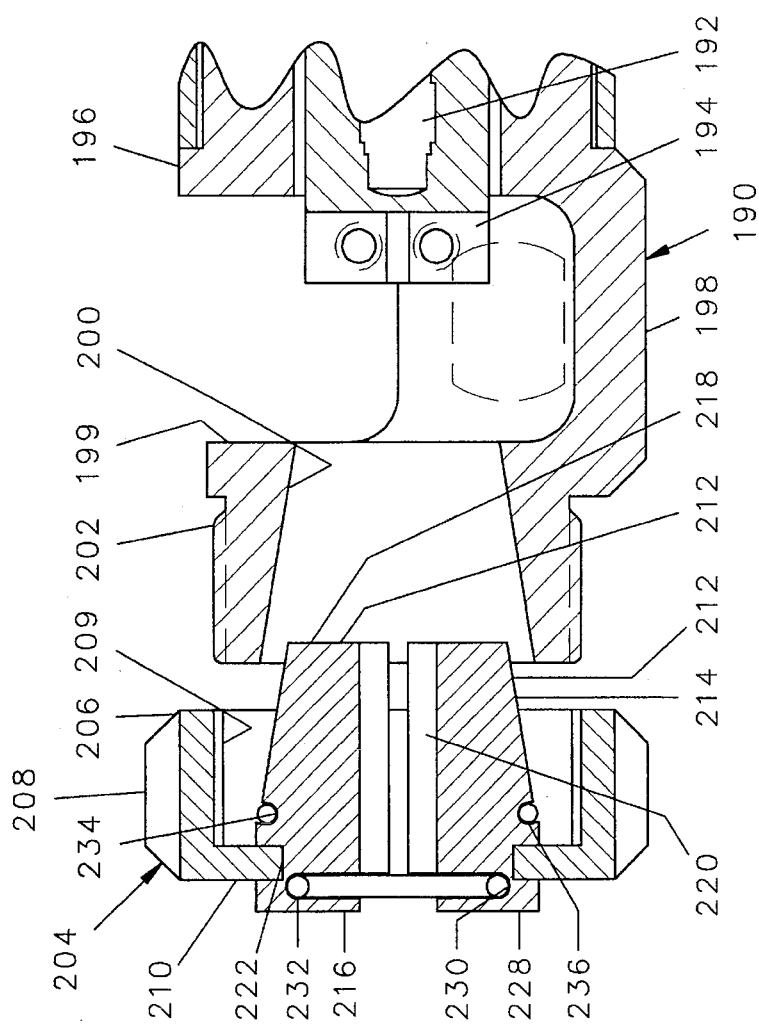
FIG. 9 is a fragmentary cross-sectional view of the working end of a tube squaring machine having a retainer and a nut and collet in accordance with a second embodiment of the invention.

Referring to FIGS. 9 and 10, a second embodiment of the invention for retaining a piece of tubing in a tube squaring machine is depicted. In this embodiment, a tube squaring machine 190 has a rotating central shaft 192 with a cutting tool 194 attached to the forward end thereof. The machine 190 includes a housing 196 with an arm 198 at the forward end thereof, and in the forward end of the arm 198 is a generally tubular collet retainer 199 having a frustoconical inner surface 200 and a threaded cylindrical outer surface 202. The inner and outer surfaces 200, 202 respectively are co-axial and axially aligned with the axis of the shaft 192 such that a work piece retained therein will be in axial alignment with the tool 194.

A collet assembly 204 in accordance with the present invention includes a nut 206 having a plurality of ribs 208 on the outer surface thereof, and a threading 209 in the inner surface which are complementary to the threading 202 on the retainer 199. At the rear end of the nut 206 is an interior annular flange 210. Fitted over the flange 210 are a plurality of wedge segments 212. In this embodiment, four wedge segments 212 are depicted. Each of the wedge segments 212 has an outer surface 214 which is a portion of a frustoconical surface. In the embodiment depicted, each of the outer surfaces 214 is one fourth of a frustoconical surface such that when all four segments 212 are aligned adjacent to one another to form a collet 204 as depicted, the outer surfaces 214 define a single frustoconical surface complementary in shape to the frustoconical surface 200 of the retainer 199. Each of the wedge segments 206 has a large end 216, a small end 218, and an inner surface 220.

Each of the wedge segments 206 has a groove 222 around the larger end 216 thereof, and the grooves 222 of the segments align to form an annular groove around the outer surface 214 of the assembled collet 204, the annular groove having planar first and second side surfaces spaced apart a distance which is a little greater than the thickness of the annular flange 210 of the nut 206. The segments 212 are retained within the central opening of the nut 206 by fitting the grooves 222 thereof around the flange 210.

Each of the segments 212 further has an arcuate flange 228 along the outer edge of the larger end 216, and when the segments are assembled to form a collet 204, the arcuate flanges 228 define a cylindrical flange having an undercut 230 into which is fitted an O-ring 232. The O-ring 232 applies a radially outward force against the wedge segments 212 thereby retaining the grooves 222 of the segments 212 against the flange 210. The segments 212 further have a second annular groove 234 around the outer surfaces 214 for receiving a second O-ring 236 to retain the forward smaller ends 218 of the collet 204 in alignment with each other.

The inner surface 220 of each of the segments 212 is a quarter portion of a cylindrical surface such that when the segments 212 are assembled adjacent one another, the combined inner surfaces 220 define a cylindrical inner bore adapted to receive a work piece of a given size. As can be seen in FIG. 10, when the segments 214 are assembled within the nut 206 and retained against the flange 210 by the O-ring 232, the segments will be spaced from one another such that the segments can be compressed together around a work piece within the inner surfaces of the segments 214 when the segments are forced into the frustoconical bore 200 of the retainer 199.

To retain a work piece within the collet 204 for squaring the end thereof, an operator will loosely thread a nut and collet 204 of the appropriate size to the threaded end of the retainer 199. Next the operator will insert a work piece in the generally cylindrical opening of the collet while is retained in the expanded position by the first O-ring 232. When the operator determines the work piece is properly oriented within the collet, he or she will rotate the nut 206 by grasping the flanges 208 and tighten it against the retainer 199, and thereby compress the segment 212 within the frustoconical bore 200, and against a work piece.

Should the operator decide that a collet of a different size is required, the segments 212 of the collet can be removed from the nut 206 by threading the nut 206 and the collet 204 onto the retainer 199 without a workpiece in the bore of the collet. Without a workpiece between the segments 212, the segments can be compressed within the frustoconical bore of the retainer 199 until the flange 210 of the nut 206 no longer extends into the grooves 222. The nut 206 can then be unthreaded from the threadings 202 of the retained while the segments 214 remain within the frustoconical opening 200. The segments 212 can then be removed from the retainer 199, and another set of segments having inner surfaces 200 which form a collet of the desired size, and the associated O-rings, can be inserted into the retainer. When the nut 206 is again threaded on to the retainer 199 and the grooves of the new segments can be aligned around the flange 210 of the nut and the nut 206 with the new segments aligned thereon can then be loosened to receive a work piece.

It should be appreciated that although the retainer is depicted as having exterior threaded outer surface 202 on which the interior threads of the nut 206 are threaded, the segments 212 of the collet can be retained in any cylindrical member having an inner flange 210 or other means for retaining the segments in alignment. The cylindrical member could, by way of example, have exterior thread which are received in interior threads of a collet holder.

While the present invention has been described in connection with several embodiments, it will be understood by those skilled in the art that many changes may be made without departing from the true spirit and scope of the present invention. Therefore it is intended by the appended claims to cover all such changes and modifications which come within the true spirit and scope of this invention.

I claim:

1. A tube squaring machine comprising in combination, a housing having a first end, a second end, and a tubular section between said first end and said second end, a drive member rotatable within said housing, a shaft axially slidable relative to said drive member, said shaft having a first end, a feed screw having a threaded cylindrical outer surface, said feed screw rotatable in said housing, a cap fitted over said first end of said housing, said cap fixed to said feed screw for movement therewith, said feed screw entirely enclosed in said housing, means for locking said feed screw against axial movement within said housing, a feed ring axially movable within said housing, means for locking said feed ring against rotation within said housing, attachment means for rotatably attaching said shaft to said feed ring, said attachment means extending from an end of said shaft, said feed screw having an axial opening on an end thereof for receiving at least a portion of said attachment means, said feed ring having a cylindrical inner surface with threads along a portion thereof, said threads of said feed screw engaged with said threads of said feed ring, and means for retaining a tool at said second end of said housing.

2. A machine in accordance with claim 1 and further comprising indices on one of said cap and said housing and a marking on the other of said cap and said housing.

3. A tube squaring machine comprising in combination;

a housing having a first end, a rotatable shaft extending from said first end of said housing, said shaft having an axis feed means for selectively axially extending and retracting said rotatable shaft, a first retainer having a first retainer body having a first end and a second end, attachment means on said first end of said first retainer body for removably attaching said first retainer to said first end of said housing, first grasping means on said second end of said first retainer body, said first grasping means for grasping a cylindrical object having a first range of diameters which can be grasped thereby, said first retainer body having a cantilevered axially extending substantially C-shaped mounting portion defining a semi-cylindrical section forming an open area for viewing the tube, the retainer body further having a midsection with an arcuate cross-sectional shape where said cross-section is taken perpendicular to said axis of said shaft when said first retainer is attached to said first end of said housing, a second retainer having a second retainer body having a first end and a second end, attachment means on said first end of said second retainer body for removably attaching said second retainer to said first end of said housing, second grasping means on said second end of said second retainer body, said second grasping means for grasping a cylindrical object having a second range of diameters which can be grasped thereby, where said second range of diameters is different from said first range of diameters, and said second retainer body having a cantilevered axially extending substantially C-shaped mounting portion defining a semi-cylindrical section forming an open window area for viewing the tube, the retainer body further having a midsection with an arcuate cross-sectional shape where said cross-section is taken perpendicular to said axis of said shaft when said second retainer is attached to said first end of said housing means for retaining a tool on said rotatable shaft.

4. A machine in accordance with claim 3 wherein said first means for grasping comprises a first jaw member and a second jaw member, said second jaw member moveable with respect to said first jaw member.

5. A machine in accordance with claim 4 and further including first and second pairs of replaceable shoes for insertion within said first jaw member and said second jaw member, said first pair of replaceable shoes for retaining a cylindrical object of a different size than said second pair of replaceable shoes.

6. A machine in accordance with claim 3 wherein said first means for grasping includes means for grasping a plurality of sizes of cylindrical objects therein.

7. A tube squaring machine comprising in combination, a housing having a first end, a second end, and a tubular section between said first end and said second end, a drive member rotatable within said housing, a shaft axially slidable relative to said drive member, said shaft having a first end, a feed screw having a threaded cylindrical outer surface, said feed screw rotatable in said housing, a cap fitted over said first end of said housing, said cap fixed to said feed screw for movement therewith, said feed screw entirely enclosed in said housing, means for locking said feed screw against axial movement within said housing, a feed ring axially movable within said housing, means for locking said feed ring against rotation within said housing, first attachment means for rotatably attaching said shaft to said feed ring, said first attachment means extending from an end of said shaft, said feed screw having an axial opening at an end thereof for receiving at least a portion of said attachment means, said feed ring having a cylindrical inner surface with threads along a portion thereof, said threads of said feed screw engaged with said threads of said feed ring, and a first retainer having a first retainer body having a first end and a second end, a second attachment means on said first end of said first retainer body for removably attaching said first retainer to said first end of said housing, first grasping means on said second end of said first retainer body, said first grasping means for grasping a cylindrical object having a first range of diameters which can be grasped thereby, said first retainer body having a cantilevered axially extending substantially C-shaped mounting portion defining a semi-cylindrical section forming an open window area for viewing the tube, the retainer body further having a midsection with an arcuate cross-sectional shape where said cross-section is taken perpendicular to said axis of said shaft when said first retainer is attached to said first end of said housing, a second retainer having a second retainer body having a first end and a second end, third attachment means on said first end of said second retainer body for removably attaching said second retainer to said first end of said housing, second grasping means on said second end of said second retainer body, said second grasping means for grasping a cylindrical object having a second range of diameters which can be grasped thereby, where said second range of diameters if different from said first range of diameters, and said second retainer body having a cantilevered axially extending substantially C-shaped mounting portion defining a semi-cylindrical section forming an open window area for viewing the tube, the retainer body further having a midsection with an arcuate cross-sectional shape where said cross-section is taken perpendicular to said axis of said shaft when said second retainer is attached to said first end of said housing means for retaining a tool on said rotatable shaft.

\* \* \* \* \*